US009604163B2

(12) United States Patent
Hatae et al.

(10) Patent No.: US 9,604,163 B2
(45) Date of Patent: Mar. 28, 2017

(54) INTERNAL COMBUSTION ENGINE

(71) Applicant: HONDA MOTOR CO., LTD., Tokyo (JP)

(72) Inventors: Ryo Hatae, Wako (JP); Kohei Omori, Wako (JP); Masakazu Hoshino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 179 days.

(21) Appl. No.: 14/481,529

(22) Filed: Sep. 9, 2014

(65) Prior Publication Data
US 2015/0090216 A1    Apr. 2, 2015

(30) Foreign Application Priority Data

Sep. 30, 2013  (JP) ................. 2013-205769

(51) Int. Cl.
| F01M 1/02 | (2006.01) |
| B01D 35/00 | (2006.01) |
| F01M 1/10 | (2006.01) |
| F01M 11/00 | (2006.01) |
| F01M 5/02 | (2006.01) |
| F02B 75/02 | (2006.01) |
| F01M 11/02 | (2006.01) |
| F01M 11/04 | (2006.01) |

(52) U.S. Cl.
CPC ............ B01D 35/005 (2013.01); F01M 1/10 (2013.01); F01M 1/02 (2013.01); F01M 11/0004 (2013.01); F01M 11/02 (2013.01); *F01M 2001/1064* (2013.01); *F01M 2005/023* (2013.01); *F01M 2011/007* (2013.01); *F01M 2011/0029* (2013.01); *F01M 2011/0054* (2013.01); *F01M 2011/0416* (2013.01); *F01M 2011/0425* (2013.01); *F02B 2075/025* (2013.01); *F02B 2075/027* (2013.01)

(58) Field of Classification Search
CPC ...... F01M 11/02; F01M 1/02; F01M 11/0004; F01M 2005/023; F01M 2011/007; F02B 2075/027; F02B 2075/025
USPC ....................................... 123/196 R
See application file for complete search history.

(56) References Cited

U.S. PATENT DOCUMENTS 2,276,393 A * 3/1942 Hill ................. F02F 7/0014
                                                    184/6
5,368,181 A * 11/1994 Myers .............. F01M 11/0408
                                                   141/65
2003/0029412 A1* 2/2003 Kato ................... F01M 5/02
                                                    123/195 C

FOREIGN PATENT DOCUMENTS

JP        2005-009346 A    1/2005

* cited by examiner

Primary Examiner — Hung Q Nguyen
Assistant Examiner — Charles Brauch
(74) Attorney, Agent, or Firm — Birch, Stewart, Kolasch & Birch, LLP

(57) ABSTRACT

A technique for making air less likely to enter a strainer in an internal combustion engine in which the strainer is supported by a drain bolt. In an internal combustion engine in which a drain bolt supports a strainer and is configured to discharge a drain is attached to a bottom of a sump. A drain hole into which the drain bolt is screwed and a strainer hole are arranged coaxially. A crankcase is provided with an oil passage through which oil is returned to the sump. The oil passage includes a first passage through which the oil flows in a direction away from the strainer, a return passage that turns around from a forefront end of the first passage, and a second passage through which the oil flows from a forefront end of the return passage toward the strainer.

20 Claims, 7 Drawing Sheets

INTERNAL COMBUSTION ENGINE

CROSS-REFERENCE TO RELATED APPLICATIONS

The present application claims priority under 35 USC 119 to Japanese Patent Application No. 2013-205769 filed Sep. 30, 2013 the entire contents of which are hereby incorporated by reference.

BACKGROUND OF THE INVENTION

1. Field of the Invention

The present invention relates to improvement in an internal combustion engine in which a strainer is provided in a sump.

2. Description of Background Art

A sump of an internal combustion engine usually is provided with a strainer formed in a mesh form and configured to remove foreign substances contained in an oil. See, for example, Japanese Patent Application Publication No. 2005-9346, FIG. 2.

As illustrated in FIG. 2 of Japanese Patent Application Publication No. 2005-9346, an oil pan to store an oil is formed at a lower portion of a crankcase, and a strainer (9) is attached to an upper wall (19) (the number in parentheses indicates a reference numeral described in Japanese Patent Application Publication No. 2005-9346; the same applies to the following) in this oil pan, an oil drain port (23) is formed in a bottom wall (22) of the oil pan coaxially with the strainer (9) with a drain bolt (16) fastened to the oil drain port (23). The strainer (9) is supported by the drain bolt (16).

In the technique described in Japanese Patent Application Publication No. 2005-9346, since the oil drain port (23) is arranged coaxially with the strainer (9), air may possibly enter the strainer (9) from the bottom wall (22) of the oil pan during an oil change. In addition, the oil returning to the oil pan after circulating in the engine contains bubbles (air), and the bubbles (air) may possibly enter the strainer (9). Thus, there is a demand for a technique to make air less likely to enter the strainer (9).

SUMMARY AND OBJECTS OF THE INVENTION

An embodiment of the present invention is to provide a technique to make air less likely to enter a strainer in an internal combustion engine in which the strainer is supported by a drain bolt.

According to an embodiment of the present invention an internal combustion engine is provided in which a sump to pool oil is formed in a lower portion of a crankcase, a strainer is housed in the sump with a strainer hole into which the strainer is insertable from below is provided in a ceiling of the sump. A drain bolt is provided for supporting the strainer and configured to discharge a drain. The drain bolt is attached to a bottom of the sump. A drain hole, into which the drain bolt is screwed, and the strainer hole are arranged coaxially. A partition wall for partitioning the sump into upper and lower sides is provided in the sump. The strainer is attached to the lower side below the partition wall with a lower surface of the partition wall being provided with a slope in a front-rear direction or a left-right direction.

According to an embodiment of the present invention, the lower surface of the partition wall is provided with a slope convex downwardly with front and rear sides or left and right sides of the lower surface inclined upwardly. The strainer hole for the strainer is provided at a level lower than an uppermost portion of the slope.

According to an embodiment of the present invention, an oil passage hole through which the oil flows from a cover of the crankcase to the sump is formed in the cover of the crankcase. A part of the oil passage hole is formed to face a lowermost point of an upper surface of the partition wall.

According to an embodiment of the present invention, the strainer includes a pipe portion with a flange portion serving as an inlet portion provided below the pipe portion, formed in a hollow flange form and opened downwardly. A mesh is inserted between the pipe portion and the flange portion. An upper end of the pipe portion is connected to an oil channel opened in the ceiling with the flange portion being supported by the drain bolt.

According to an embodiment of the present invention, the partition wall is connected to any one of front, rear, left and right sides of the ceiling of the sump.

According to an embodiment of the present invention, the partition wall and the sump are connected together with a side wall interposed in between, the strainer is attached to one of the left and right sides of the sump in a width direction, and the side wall is formed to hinder an oil flow at an opposite end side of the strainer in a front or rear direction.

According to an embodiment of the present invention, the partition wall is formed to face the drain hole. An outlet of the second passage is provided with an oil discharge hole.

According to an embodiment of the present invention, a bubble release hole is provided to a connection portion of the partition wall with the ceiling.

According to an embodiment of the present invention, the sump is provided with the partition wall partitioning the sump into the upper and lower sides, the strainer is attached to the lower side below the partition wall, and the lower surface of the partition wall is provided with the slope in the front-rear direction or the left-right direction.

The oil returned after circulation inside the internal combustion engine moves along the slope provided to the lower surface of the partition wall. During this movement, the oil hits against the slope and flows at a reduced flow speed. Thus, a time required for the oil movement can be increased by a corresponding amount. More specifically, the oil spends more time on passing along the lower surface of the partition wall, which facilitates removal of bubbles contained in the oil. Consequently, the bubbles can be made less likely to be sucked into the strainer.

According to an embodiment of the present invention, the lower surface of the partition wall is provided with the slope convex downwardly with the front and rear sides or the left and right sides of the lower surface inclined upwardly. The oil returned from the cover side of the crankcase passes along the slope and is guided to the strainer hole for the strainer. Since the strainer hole for the strainer is formed at a level lower than the uppermost portion of the slope, bubbles can be inhibited from entering the strainer hole for the strainer.

According to an embodiment of the present invention, the oil passage hole through which the oil flows is provided in the cover of the crankcase and part of the oil passage hole is formed to face the lowermost point of the upper surface of the partition wall. Thus, the oil arriving at the lowermost point of the upper surface of the partition wall ascends along the partition wall. In this process, removal of bubbles contained in the oil can be facilitated.

According to an embodiment of the present invention, the strainer includes the inlet portion opened downwardly. Since the inlet portion is opened downwardly, bubbles contained in the oil can be inhibited from being sucked into the inlet portion.

According to an embodiment of the present invention, the partition wall is connected to any one of the front, rear, left and right sides of the ceiling of the sump. This structure can smoothly guide the oil returned from the cover of the crankcase to the strainer via the sump.

According to an embodiment of the present invention, the strainer is attached to one of the left and right sides of the sump in the width direction, and the side wall is formed to hinder the oil flow at the opposite end side of the strainer in the front-rear direction. This structure reduces the flow speed of the oil, and accordingly further promotes removal of the bubbles contained in the oil.

According to an embodiment of the present invention, the partition wall is formed to face the drain hole, and the outlet of the second passage is provided with the oil discharge hole. The oil discharge hole enables the oil to be drained completely from the sump in drainage of the oil.

According to an embodiment of the present invention, the bubble release hole is provided to the connection portion of the partition wall with the ceiling. This facilitates a release of bubbles through the bubble release hole, the bubbles flowing along the partition wall and entering the sump. As a result, the bubbles released through the bubble release hole can be more easily discharged to the cover side of the crankcase.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
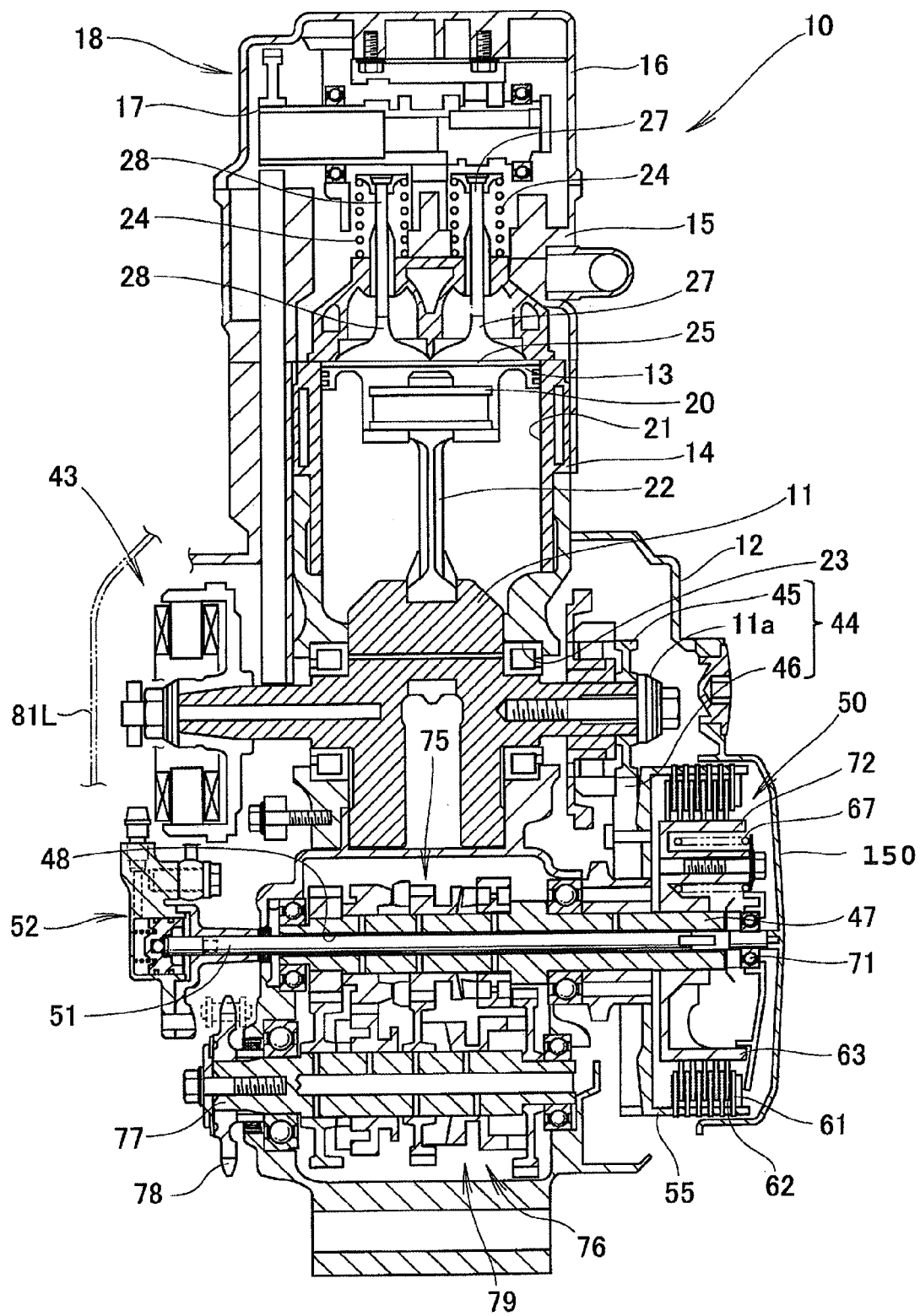
FIG. 1 is a development view of an internal combustion engine according to the present invention.

Hereinafter, an embodiment of the present invention is described in details. In the drawings and the embodiment, "up or upper," "down or lower," "front," "rear," "left" and "right" indicate such directions that, in a side view of an internal combustion engine, a crankshaft extends horizontally in the right-left direction, a cylinder extends in the up-down direction, and the crankshaft and an output shaft are arranged in the front-rear direction.

The embodiment of the present invention is explained based on the accompanying drawings.

An internal combustion engine 10 (hereinafter also referred to as an "engine 10") includes a crankcase 12 surrounding a crankshaft 11; a cylinder block 14 placed on the crankcase 12 and allowing a piston 13 to slide in the up-down directions; a cylinder head 15 placed on the cylinder block 14 and supporting a valve train 18 including a cam shaft 17 and a head cover 16 placed on the cylinder head 15 for covering the valve train 18.

A cylinder bore 21 is formed in the cylinder block 14 and the piston 13 is slidably placed in the cylinder bore 21. This piston 13 is connected to the crankshaft 11 via a piston pin 20 and a connecting rod 22. The crankshaft 11 is rotatably supported by a crank journal portion 23 formed in the crankcase 12.

A combustion chamber 25 is formed in a space defined by the cylinder bore 21, the cylinder head 15 and the piston 13. An air intake valve 27 and an air release valve 28 each of which opens and closes the combustion chamber 25 are arranged in the cylinder head 15. The air intake valve 27 and the air release valve 28 are biased in a valve-close direction by valve springs 24, 24.

Next, a lubrication system is explained. In the drawings, the cylinder head at an upper portion of the engine is omitted.

Figure 2:
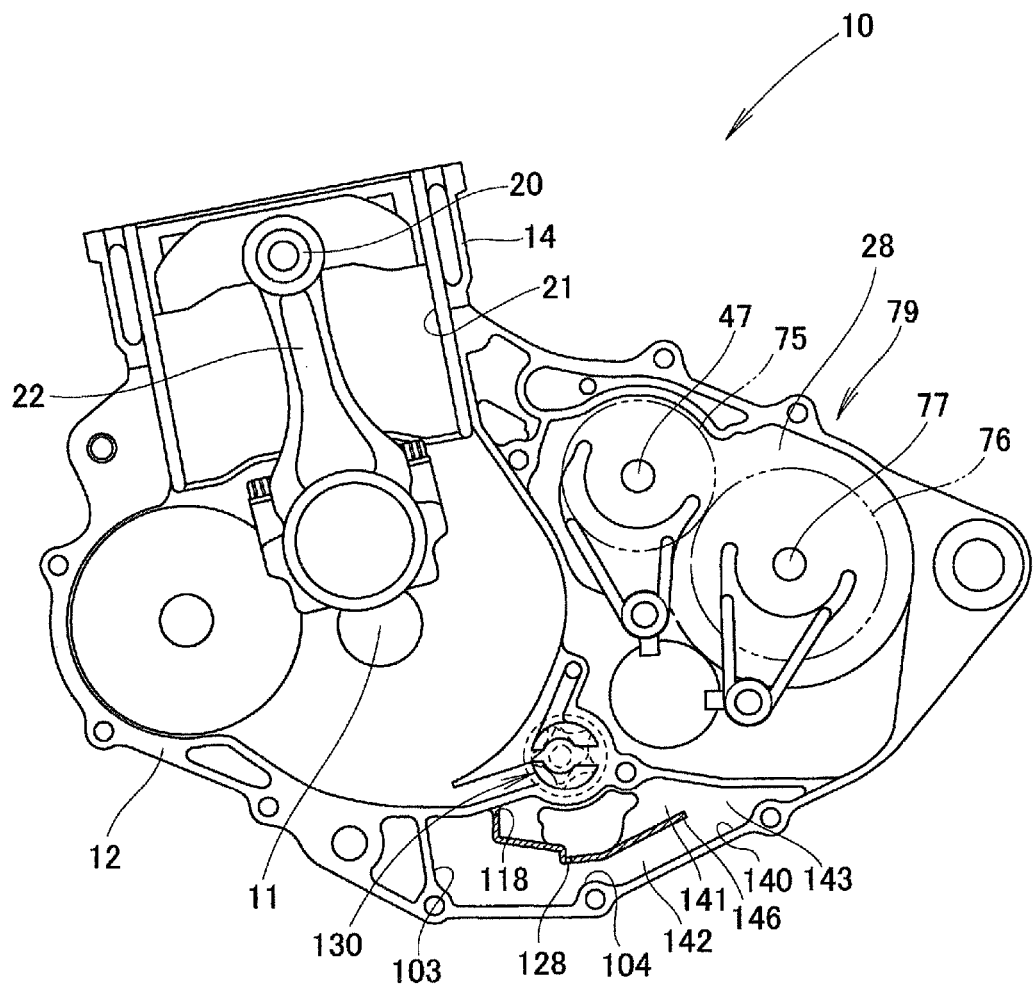
FIG. 2 is a cross sectional view for explaining a basic structure of the internal combustion engine.
Figure 3:
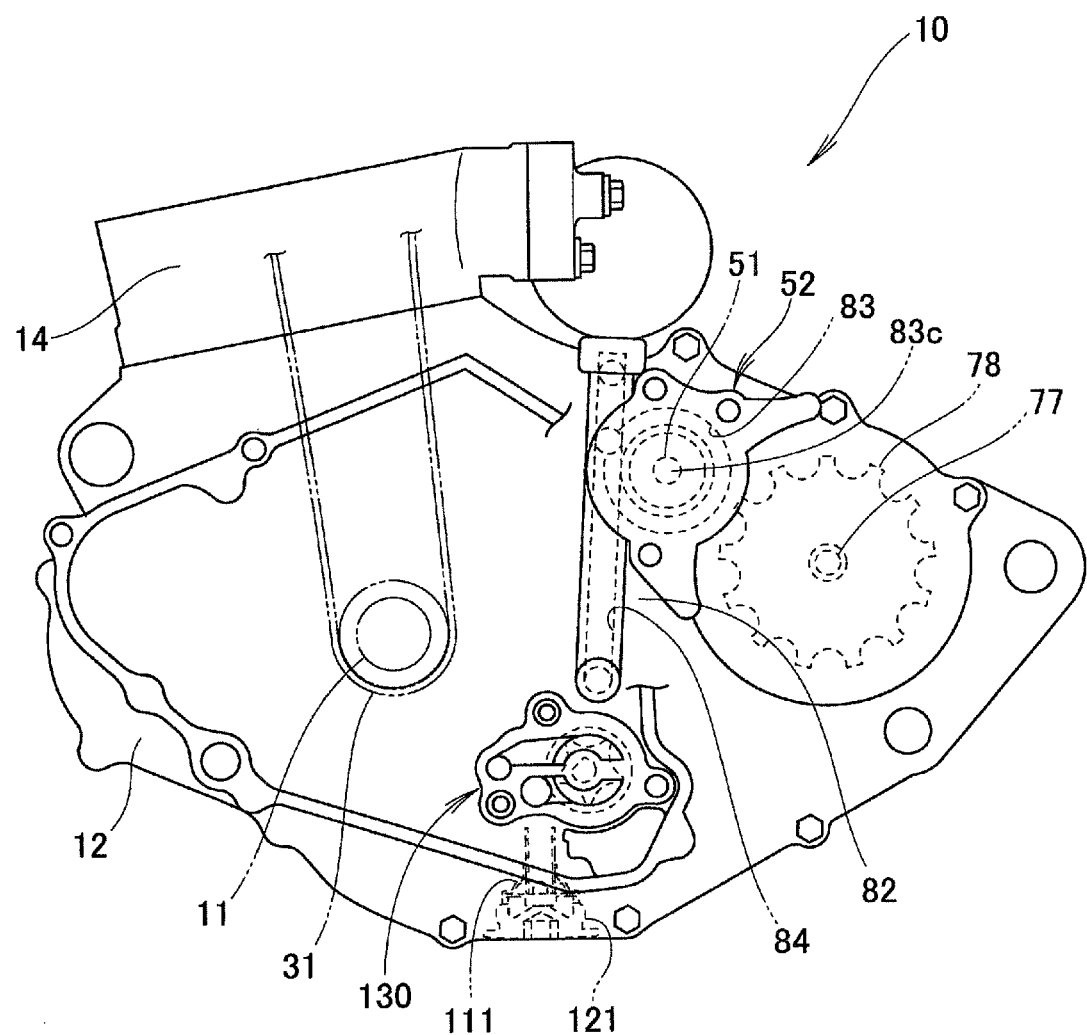
FIG. 3 is a cross sectional view of the internal combustion engine for explaining a train valve system and others.

As illustrated in FIGS. 2 and 3, a sump 103 to pool oil is formed in a lower portion of the crankcase 12. A strainer 111 including a mesh 116 for removing foreign substances contained in the oil is housed in the sump 103, and a drain bolt 121 supporting the strainer 111 and configured to discharge a drain is attached to a bottom 104 of the sump 103.

An oil pump 130 is placed above the strainer 111, and an oil channel 84 extends upwardly at a downstream side of the oil pump 130. The oil is fed from the oil channel 84 to parts constituting a transmission 28. The oil flows downwardly from the parts of the transmission 28 and is returned via an oil passage 140 to the sump 103 formed in the lower portion of the crankcase 12. The crankcase 12 is provided with the oil passage 140 to return the oil to the sump 103.

As illustrated in FIG. 1, an AC generator (ACG) 43 is arranged at a left end constituting one end of the crankshaft 11. The AC generator 43 includes as main parts a rotor and a stator which are attached to the one end of the crankshaft 11.

Next, a power transmission system of a power unit is explained. A driving gear 45 is formed integrally with the crankshaft 11 and a driven gear 46 meshing with the driving gear 45 is rotatably supported by a main shaft 47. The driven gear 46 is connected to a clutch housing 55. The driving gear 45 attached to one end 11a of the crankshaft 11 and the driven gear 46 meshing with the driving gear 45 constitute a primary reduction train 44.

A clutch 50 to disconnect and transmit power is connected to the primary reduction train 44. The main shaft 47 having a hollow portion 48 is connected to a driven side of the clutch 50. A clutch shaft 51 to connect and disconnect the clutch 50 is slidably inserted in the hollow portion 48 of the main shaft 47. The clutch shaft 51 extends to pass through the crankcase 12, and a hydraulic cylinder 52 to press the clutch shaft 51 is provided outside the crankcase 12. The hydraulic cylinder 52 is attached to the crankcase 12 on the outside of the crankcase 12.

In the clutch 50, multiple driving-side friction plates 61 provided on the clutch housing 55 and multiple driven-side friction plates 62 provided on a clutch inner 63 are alternately arranged to mesh with each other and the clutch inner 63 is connected (fastened) to the clutch housing 55 by a pressing force by a clutch spring 67 under a normal condition.

An oil pressure is applied to the hydraulic cylinder 52, the clutch shaft 51 is moved to the right side and the clutch inner 63 is pressed to the right side in the drawing against the pressing force by the clutch spring 67. In short, the clutch 50 is disconnected, and the driving power is disconnected. When a hydraulic circuit of the hydraulic cylinder 52 is disconnected, the clutch 50 is connected to transmit the driving power.

The transmission 28 includes the primary reduction train 44, the clutch 50 having the clutch housing 55, the clutch inner 63, a pressure application plate 71, the clutch spring 67, a pressure reception plate 72, the driving-side friction plates 61 and the driven-side friction plates 62. The main shaft 47 is connected to the clutch inner 63 via a spline joint with a main gear train 75 being provided on the main shaft 47. A drive gear train 76 is provided to selectively mesh with the main gear train 75 to change a transmission gear ratio. A drive shaft 77 (also referred to as an "output shaft 77") is attached to the drive gear train 76 with a drive sprocket 78 being attached to an end portion of the output shaft 77.

More specifically, the main shaft 47 and the output shaft 77 to output the driving power are inserted into a gear transmission 79 including the main gear train 75 and the drive gear train 76, and the driving power of the internal combustion engine 10 is transmitted to the crankshaft 11, the primary reduction train 44, the clutch 50, the main shaft 47 and the gear transmission 79 and the output shaft 77 in this order. Here, left and right sides of the crankcase 12 in a vehicle width direction are covered with left and right crankcase covers 150.

Figure 4:
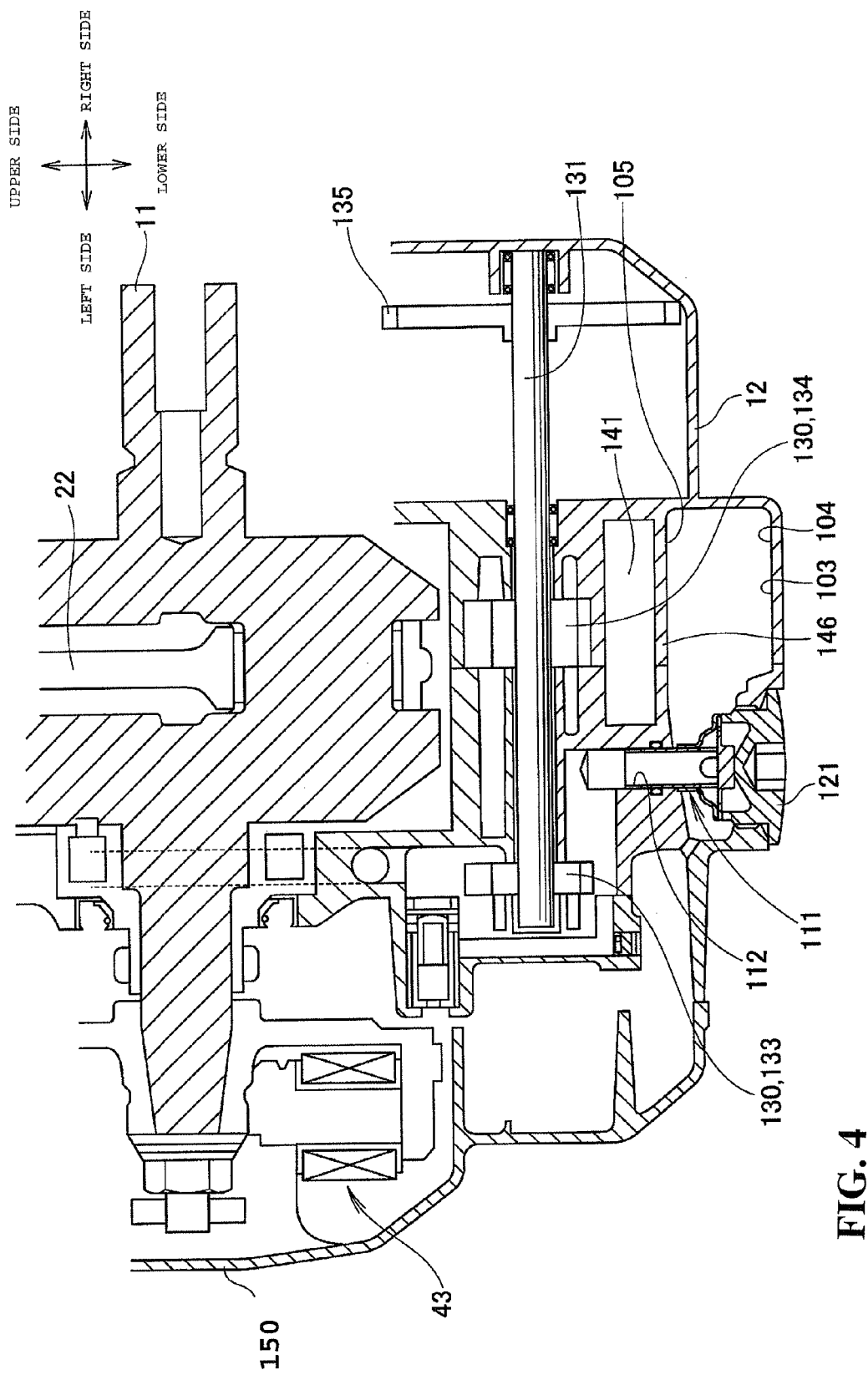
FIG. 4 is a cross sectional view of the internal combustion engine for explaining a lubrication system and others.

As illustrated in FIG. 4, the sump 103 to pool the oil is formed in the lower portion of the crankcase 12, the strainer 111 is housed in the sump 103, a strainer hole 112 in which the strainer 111 can be inserted from below is formed in a ceiling 105 of the sump 103, and the drain bolt 121 supporting the strainer 111 and configured to discharge the drain is attached to the bottom 104 of the sump 103. A drain hole 122 into which the drain bolt 121 is screwed is arranged coaxially with the strainer hole 112.

The sump 103 is provided with a partition wall 146 partitioning the sump 103 into upper and lower sides. The strainer 111 is attached to the lower side below the partition wall 146.

With reference to FIG. 1 together, in the oil pump 130 of the lubrication system, a first pump 133 and a second pump 134 are provided coaxially to a pump shaft 131 and extend horizontally. The first pump 133 feeds the oil to a combustion system such as the crankshaft 11 and the cam shaft 17, and the second pump 134 feeds the oil to a transmission system such as the gear transmission 79. A pump gear 135 is attached to the pump shaft 131. The pump gear 135 meshes with the primary reduction train 44 and is always driven while the crankshaft 11 is rotating.

Figure 5:
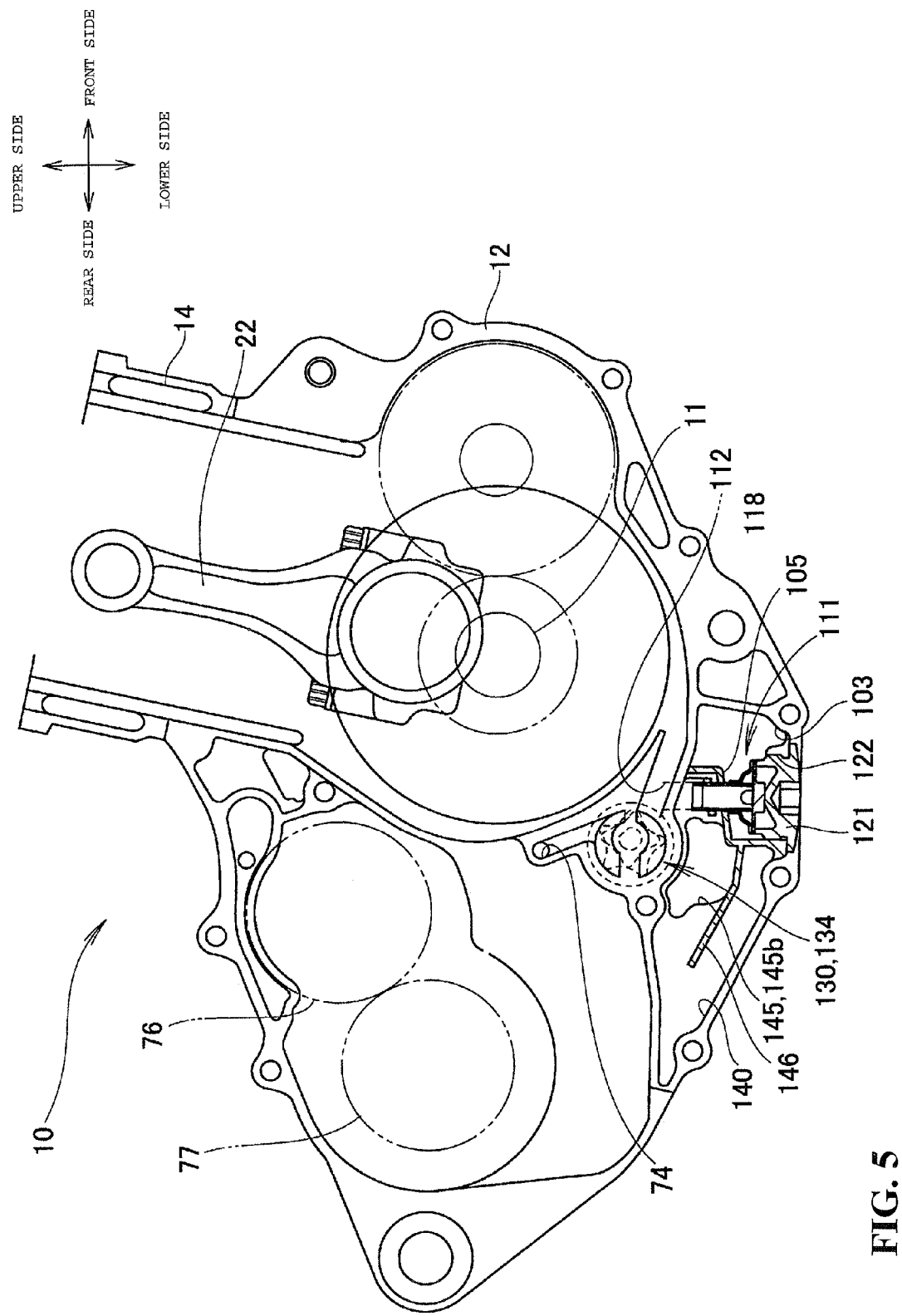
FIG. 5 is a cross sectional view of the internal combustion engine for explaining structures and others of a drain plug and a strainer.

As illustrated in FIG. 5, the second pump 134 is arranged on a right side of the internal combustion engine 10 (engine) in the width direction. A lateral oil channel 74 through which the oil sent from the second pump 134 flows extends in a direction from a front side toward a back side of the drawing. A downstream end of the lateral oil channel 74 communicates with the oil channel 84 (see FIG. 3) arranged at a crankcase side wall 82 (left side wall) to extend in the up-down direction, and oil channels branch off from the oil channel 84 to feed the oil to the main shaft 47 and the gear transmission 79.

Figure 6:
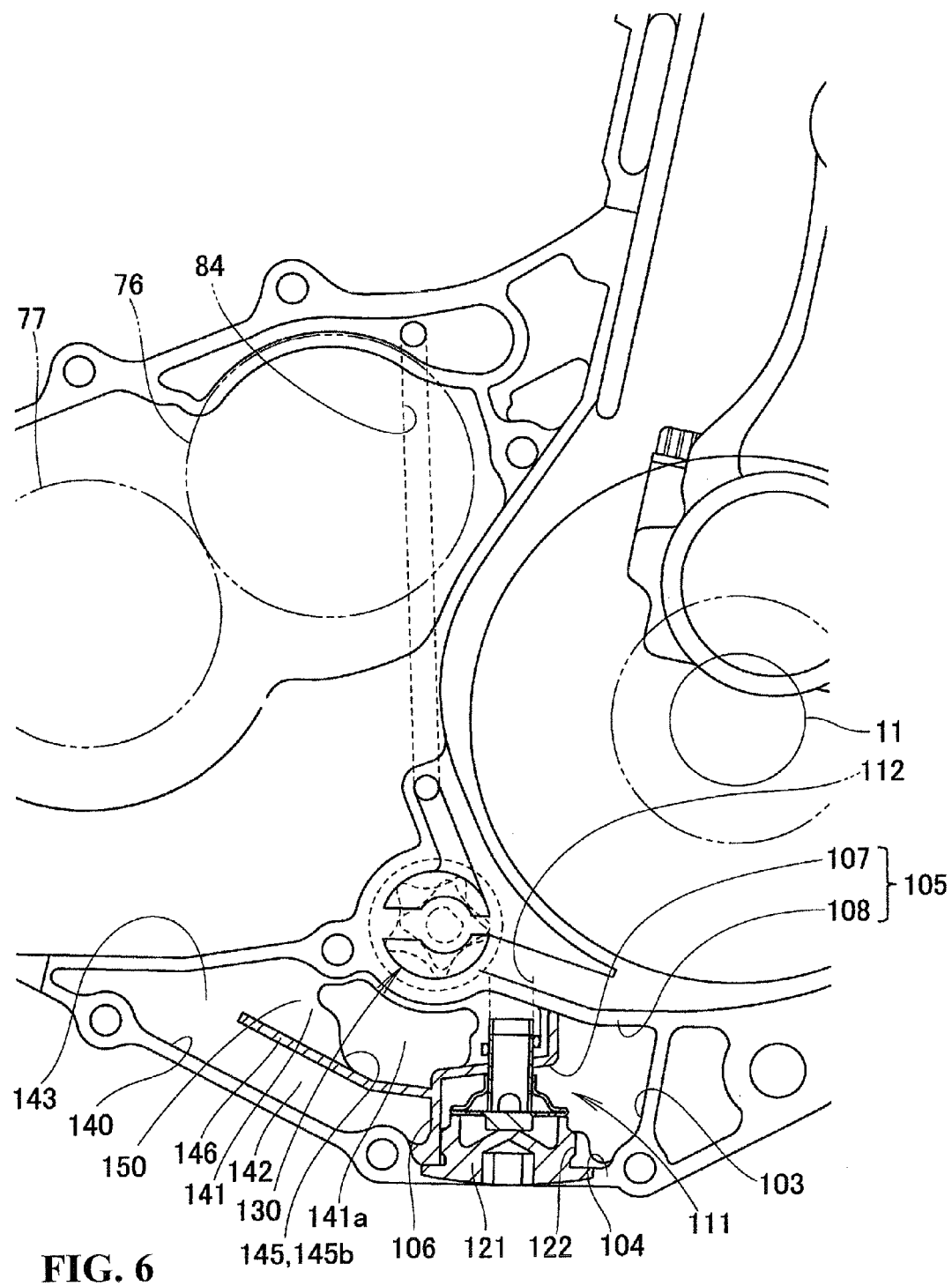
FIG. 6 is a cross sectional view of the internal combustion engine for explaining a lubrication route of an oil pump.

As illustrated in FIG. 6, an oil passage hole 145 through which the oil flows is formed in a cover 150 of the crankcase 12, and an outlet 145b of the oil passage hole 145 is continued to an inlet 141a of a first passage 141. The oil having passed through the oil channel 84 for lubricating the transmission system is returned from the outlet 145b of the oil passage hole 145, which is formed in the cover of the crankcase 12 and through which the oil flows, and then enters the inlet 141a of the first passage 141.

Next, a structure of the sump 103 is explained.

The sump 103 includes the bottom 104 in which the drain hole 122 is formed, a side wall 106 extending upwardly from a rear end of the bottom 104, and the ceiling 105 extending from an upper end of the side wall 106. The ceiling 105 includes a first ceiling 107 inclined obliquely upwardly toward the front, and a second ceiling 108 located in front of the first ceiling 107. The strainer 111 is attached to the first ceiling 107.

Figure 7:
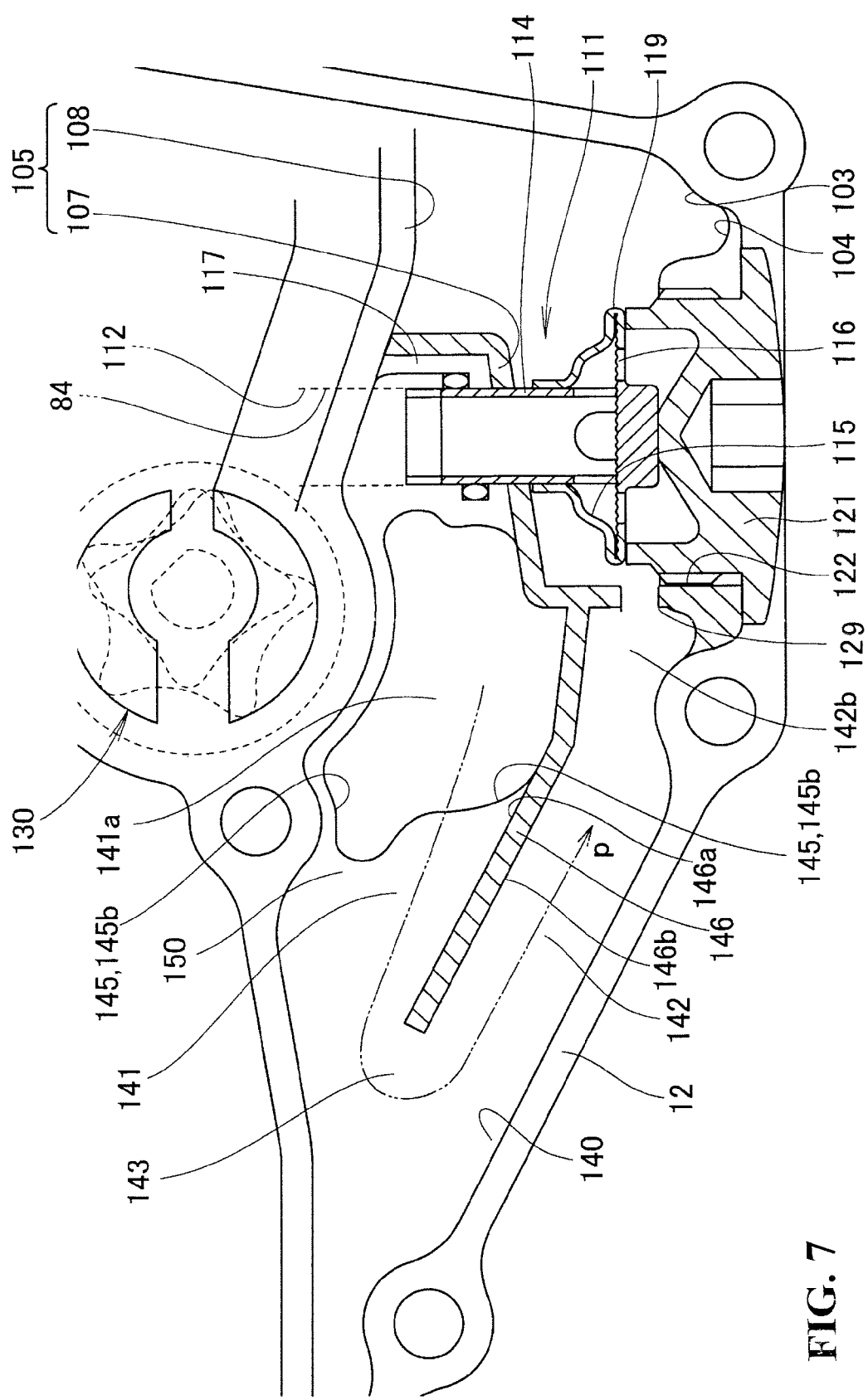
FIG. 7 is an enlarge view of an important part of FIG. 5 for explaining the structures and others of the drain plug and the strainer.

As illustrated in FIGS. 2 and 7, the oil passage 140 to return the oil to the sump 103 includes the first passage 141 through which the oil flows substantially laterally in a direction away from the strainer 111, a return passage 143 that turns downwardly from a forefront end of the first passage 141, and a second passage 142 through which the oil flows substantially laterally from a forefront end of the return passage 143 toward the strainer 111. More specifically, the first passage 141 is formed with an ascending slope and the second passage 142 is formed with a descending slope.

In the oil passage 140, the first passage 141 and the second passage 142 are separated from each other by the partition wall 146, and the partition wall 146 is connected to the ceiling 105 of the sump 103. An outlet 142b of the second passage 142 is covered with the side wall 106 of the sump 103.

Moreover, the oil passage hole 145 through which the oil flows from the cover 150 of the crankcase to the sump 103 is formed in the cover 150 of the crankcase 12. The oil passage hole 145 is formed such that a part thereof faces a lowermost point of an upper surface 146a of the partition wall 146.

A lower surface 146b of the partition wall 146 is provided with a slope in the front-rear direction. More specifically, the lower surface 146b of the partition wall 146 is provided with a slope convex downwardly with its front and rear sides inclined upwardly.

Although the lower surface of the partition wall is provided with the downwardly-convex slope in the front-rear direction in the present embodiment, the lower surface of the partition wall may be provided with a slope convex downwardly with its left and right sides inclined upwardly.

The strainer 111 includes a pipe portion 114, a flange portion 119 serving as an inlet portion 115 provided below the pipe portion 114, formed in a hollow flange form and opened downwardly, and the mesh 116 inserted between the pipe portion 114 and the flange portion 119. The strainer 111 is attached with an upper end of the pipe portion 114 connected to the oil channel 84 opened in the ceiling 105, and with the flange portion 119 supported by the drain bolt 121. A bubble release hole 118 (see FIG. 2) is provided in a connection portion 117 of the partition wall 146 with the ceiling 105.

As illustrated in FIG. 4, the strainer 111 is attached to one (left side) of the left and right sides of the sump 103 in the width direction. Returning to FIG. 7, the side wall 106 is formed to hinder the oil flow at an opposite end side (the front end) of the strainer in the front-rear direction.

The partition wall 146 is formed to face the drain hole 122, and an oil discharge hole 128 (see FIG. 2) is provided to the outlet 142b of the second passage 142.

The effects of the foregoing internal combustion engine 10 are described hereinafter.

The oil passage 140 for returning the oil to the sump 103 includes the first passage 141, the return passage 143 that turns down from the forefront end of the first passage 141, and the second passage 142 through which the oil flows substantially laterally from the forefront end of the return passage 143 toward the strainer 111. The first oil channel 141 is formed with the ascending slope.

The oil returned after circulation inside the internal combustion engine hits against the ascending slope of the first passage 141 and flows at a reduced speed. Thus, the time required for the oil movement can be increased by a corresponding amount. In other words, the oil spends more time on passing through the first passage 141, which facilitates removal of bubbles contained in the oil.

In addition, the second passage 142 is formed with the descending slope. In discarding the waste oil, air entering from the drain hole 122 provided coaxially with the strainer 111 is guided along the inclination of the second passage 142 to flow obliquely upwardly and move away from the inlet portion 115 of the strainer 111. Consequently, the first passage 141 with the ascending slope and the second passage 142 with the descending slope can make the air less likely to be sucked into the strainer 111.

The outlet 145b of the oil passage hole 145 through which the oil flows is continued to the inlet 141a of the first passage 141. The oil returned from the oil passage hole 145 provided in the cover side of the crankcase 12 is guided along the first passage 141 and then is guided to the second passage 142 by turning around in the return passage 143, as illustrated by an arrow p in the drawing. Thus, by securing a large distance for the oil flow to travel, bubbles contained in the oil can be removed more easily.

In addition, in the oil passage 140, the first passage 141 and the second passage 142 are separated from each other by the partition wall 146. The oil passage 140 promoting removal of bubbles can be simply formed by the partition wall 146. Further, the outlet of the second passage 142 is connected to the ceiling 105 of the sump 103. Thus, the oil returned from the cover side of the crankcase 12 can be smoothly guided to the strainer 111 through the second passage 142.

Moreover, the strainer 111 includes the inlet portion 115 opened downwardly. Since the inlet portion 115 is opened downward, bubbles contained in the oil can be inhibited from being sucked into the inlet portion 115.

Furthermore, the strainer 111 is attached to one of the left and right sides of the sump 103 in the width direction, and the side wall 106 is formed to hinder the oil flow at the opposite end side (the front side) of the strainer 111 in the front-rear direction. Thus, the flow speed of the oil decreases and accordingly removal of bubbles contained in the oil is promoted.

The side wall 106 of the sump 103 is provided with a through hole 129 having a smaller diameter than a hole diameter of the second passage 142, and the oil is caused to flow through the through hole 129 from the second passage 142 to the sump 103. The oil flow is narrowed when passing through the through hole 129 to the sump 103. This provides for promoting the removal of the bubbles to an extent corresponding to a reduction in the flow speed.

In addition, the outlet 142b of the second passage 142 is formed to face the drain hole 122, and the oil discharge hole 128 is provided in the outlet 142b. In the case of oil drainage, the oil can be drained completely by flowing out from the sump 103 through the oil discharge hole 128.

Moreover, the bubble release hole 118 is provided near the ceiling 105 of the sump 103, more specifically, to the connection portion 117 of the partition wall 146 with the ceiling 105. This facilitates the release of bubbles through the bubble release hole 118, the bubbles flowing along the partition wall 146 and entering the sump 103. Consequently, the bubbles released through the bubble release hole 118 can be more easily discharged to the crankcase cover side.

Although the present invention is applied to an internal combustion engine mounted on a motorcycle in the present embodiment, the present invention can be also applied to an internal combustion engine mounted on a tricycle, and may be applied to any internal combustion engine mounted on a general vehicle.

The present invention is suitable for an internal combustion engine in which a drain hole into which a drain bolt is screwed and a strainer hole are provided coaxially.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine comprising:
a sump to pool oil being formed in a lower portion of a crankcase, the sump having a bottom wall and a ceiling spaced from the bottom wall in a vertical direction;
a strainer hole in the ceiling of the sump;
a strainer in the sump, the strainer insertable into the strainer hole from below,
a drain hole in the bottom wall of the sump, the drain hole vertically aligned with the strainer hole;
a drain bolt retained in the drain hole, the drain bolt supporting the strainer; and
a partition wall provided in the sump between the bottom wall and ceiling for partitioning the sump into upper and lower sides.

2. The internal combustion engine according to claim 1, wherein:
the lower surface of the partition wall is provided with a slope convex downwardly with front and rear sides or left and right sides of the lower surface inclined upward; and
the strainer hole for the strainer is lower than an uppermost portion of the slope.

3. The internal combustion engine according to claim 1, wherein:
an oil passage hole through which the oil flows from a cover of the crankcase to the sump is formed in the cover of the crankcase; and
a part of the oil passage hole is formed to face a lowermost point of an upper surface of the partition wall.

4. The internal combustion engine according to claim 2, wherein:

an oil passage hole through which the oil flows from a cover of the crankcase to the sump is formed in the cover of the crankcase; and a part of the oil passage hole is formed to face a lowermost point of an upper surface of the partition wall.

5. The internal combustion engine according to claim 1, wherein:

the strainer includes a pipe portion, a flange portion extending radially outwardly and serving as an inlet portion provided below the pipe portion, formed in a hollow flange form and opened downwardly, and a mesh inserted between the pipe portion and the flange portion;

an upper end of the pipe portion is connected to an oil channel opened in the ceiling; and the flange portion is supported by the drain bolt.

6. The internal combustion engine according to claim 2, wherein the partition wall is connected to any one of front, rear, left and right sides of the ceiling of the sump.

7. The internal combustion engine according to claim 5, wherein the partition wall and the sump are connected together with a side wall interposed in between;

the strainer is attached to one of left and right sides of the sump in a width direction; and the side wall is formed to hinder an oil flow at an opposite end side of the strainer in a front or rear direction.

8. The internal combustion engine according to claim 6, wherein the partition wall and the sump are connected together with a side wall interposed in between;

the strainer is attached to one of left and right sides of the sump in a width direction; and the side wall is formed to hinder an oil flow at an opposite end side of the strainer in a front or rear direction.

9. The internal combustion engine according to claim 7, wherein the partition wall is formed to face the drain hole; and an outlet of a second passage formed by the partition is provided with an oil discharge hole.

10. The internal combustion engine according to claim 5, wherein a bubble release hole is provided to a connection portion of the partition wall with the ceiling.

11. The internal combustion engine according to claim 6, wherein a bubble release hole is provided to a connection portion of the partition wall with the ceiling.

12. A strainer for use in an internal combustion engine comprising:

a sump for pooling, said sump being formed in a lower portion of a crankcase and having a bottom wall and a ceiling spaced from the bottom wall in a vertical direction;

a strainer hole in the ceiling into which the strainer is insertable from below;

a drain bolt for supporting the strainer with a drain being attached to the bottom wall of the sump;

a drain hole in the bottom wall into which the drain bolt is screwed, said drain hole and the strainer hole being arranged coaxially;

a partition wall mounted in the sump between the bottom wall and ceiling for partitioning the sump into upper and lower sides;

said strainer being attached to the lower side below the partition wall; and a lower surface of the partition wall provided with a slope in a front-rear direction or a left-right direction.

13. The strainer for use in an internal combustion engine according to claim 12, wherein:

the lower surface of the partition wall is provided with a slope convex downwardly with front and rear sides or left and right sides of the lower surface inclined upward; and the strainer hole for the strainer is provided at a level lower than an uppermost portion of the slope.

14. The strainer for use in an internal combustion engine according to claim 12, wherein:

an oil passage hole through which the oil flows from a cover of the crankcase to the sump is formed in the cover of the crankcase; and a part of the oil passage hole is formed to face a lowermost point of an upper surface of the partition wall.

15. The strainer for use in an internal combustion engine according to claim 12, wherein:

the strainer includes a pipe portion, a flange portion serving as an inlet portion provided below the pipe portion, formed in a hollow flange form and opened downwardly, and a mesh inserted between the pipe portion and the flange portion;

an upper end of the pipe portion is connected to an oil channel opened in the ceiling; and the flange portion is supported by the drain bolt.

16. The strainer for use in an internal combustion engine according to claim 13, wherein the partition wall is connected to any one of front, rear, left and right sides of the ceiling of the sump.

17. An engine comprising:

a sump to pool oil being formed in a lower portion of a crankcase, the sump having a bottom wall and a ceiling having a lower surface spaced from the bottom wall in a vertical direction;

a strainer hole in the ceiling of the sump;

a strainer in the sump, the strainer insertable into the strainer hole from below;

a drain hole in the bottom wall of the sump, the drain hole vertically aligned with the strainer hole; and a drain bolt retained in the drain hole, the drain bolt supporting the strainer.

18. The engine of claim 17, wherein the strainer comprises:

a pipe portion;

an aperture in the pipe portion;

a flange extending radially outwardly from the pipe portion, the flange being below the aperture; and apertures in the flange to allow the passage of fluid.

19. The engine of claim 18, wherein the apertures in the flange are formed by a mesh material.

20. The engine of claim 17, wherein the drain bolt has an outer flange forming a central recess, the outer flange supporting the strainer.

* * * * *